No. 840,529. PATENTED JAN. 8, 1907.
W. S. TURPIN & J. H. HOLDEN.
UNIVERSAL JOINT.
APPLICATION FILED MAY 10, 1906.

Witnesses

Inventors
Walter S. Turpin
Jones H. Holden

UNITED STATES PATENT OFFICE.

WALTER S. TURPIN AND JONAS H. HOLDEN, OF WASHINGTON, DISTRICT OF COLUMBIA.

UNIVERSAL JOINT.

No. 840,529.　　　　Specification of Letters Patent.　　　　Patented Jan. 8, 1907.

Application filed May 10, 1906. Serial No. 316,141.

*To all whom it may concern:*

Be it known that we, WALTER S. TURPIN and JONAS H. HOLDEN, residing at Washington, in the District of Columbia, have invented certain new and useful Improvements in Universal Joints; and we do hereby declare the following to be a full, clear, and exact description of the invention, such as will enable others skilled in the art to which it appertains to make and use the same.

The present invention relates to universal joints of the type comprising suitable coupling-heads and an interposed connecting-block or binding-piece pivotally secured to the coupling-head.

The object of our invention is to provide a universal joint of the type referred to of improved construction, particularly as to the means for pivotally securing the connecting-block or common binding-piece to the coupling-head, also to provide a means of preventing the arms of the forked members from spreading, and, third, to provide a means of adjusting and locking the pivot.

With this object in view our invention consists of the universal joint hereinafter described and claimed, the advantages of which will be apparent to those skilled in the art from the following description.

Our invention will be clearly understood from the accompanying drawings, in which is illustrated a universal joint embodying our invention in its preferred form.

Figure 1:
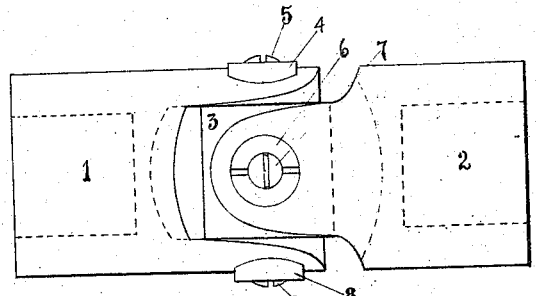
Figure 2:
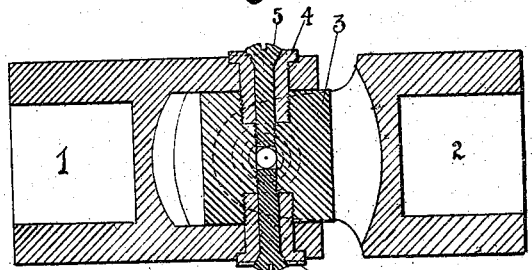
Figure 3:
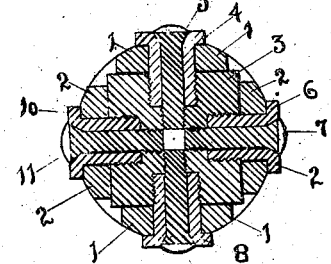

In said drawings, Figure 1 is a view in side elevation of the universal joint. Fig. 2 is a cross-section along a median horizontal line, and Fig. 3 is a transverse cross-section through the pivots.

1 and 2 represent the coupling-heads of any suitable construction, secured to or formed integral with the two shafts. (Not shown.) Between the forked ends of the coupling-heads is interposed a connecting-block or common binding-piece 3, which is pivotally secured to the coupling-heads or forked members. For pivotally securing the connecting-block or common binding-piece to the coupling-heads our invention contemplates the use of sleeves or bushings passing through the forked ends of the coupling-heads and screwing into the connecting-block or common binding-piece, and to prevent these bushings or sleeves from working out our invention contemplates the use of pins passing centrally through the sleeves or bushings and also screwing into the connecting-block with a thread of the opposite direction to that used to screw the bushings or sleeves into the connecting-block or with a thread of different pitch. The bushings are indicated in the drawings by 4, 6, 8, and 10 and are fitted with heads, effectually preventing the forks from spreading. The central hole in these sleeves is either tapered or countersunk at the top to take a tapered or flange-headed pin, as shown in the drawings and indicated by 5, 7, 9, and 11. The friction of these pins, together with the fact that the pitch of the threads on the pins 5, 7, 9, and 11 and that on the sleeves 4, 6, 8, and 10 are different or that one is right-handed and the other is left-handed, effectually prevent the sleeves from backing out or screwing up, thus locking any adjustment previously made. By allowing some clearance for the sleeves at the bottom of their holes in the connecting-block wear and lost motion may be taken up by backing out the pins 5, 7, 9, and 11 and setting up on the sleeves 4, 6, 8, and 10 and then relocking them by means of the above-mentioned pins 5, 7, 9, and 11. The block 3 is preferably rectangular in cross-section and has a sufficient extent of surface in contact with the inner surfaces of the forks of the coupling-heads to relieve the pivot-sleeves and pins of substantially all strain.

The joint above described is of simple and inexpensive construction and is reliable and efficient in operation. All the various parts can be made and finished before assembling and the four sleeves and four pins should be alike and interchangeable. The joint is then assembled and the four sleeves set up to allow any desired clearance, and then the pins inserted and set up securely, thus locking the sleeves and preventing them from backing out or tightening up.

Having thus described our invention, we claim as new and desire to secure by Letters Patent of the United States—

1. A universal joint having, in combination, coupling-heads, a block or common binding-piece interposed between the coupling-heads, and sleeves or bushings screwing into the block, pivotally connecting the block with the coupling-heads, substantially as described.

2. A universal joint having, in combination, coupling-heads, a block or common binding-piece interposed between the coupling-heads, sleeves or bushings screwing into the block pivotally connecting the block to the coupling-heads; and pins arranged to pass through the sleeves and screw into the block, substantially as described.

3. A universal joint having, in combination, coupling-heads, a block or common binding-piece interposed between the coupling-heads, four sleeves or bushings screwing into the block pivotally connecting the block to the coupling-heads, and pins arranged to pass centrally through the sleeves and screw into the block to prevent the rotation of said sleeves, substantially as described.

4. A universal joint having, in combination, coupling-heads, a block or common binding-piece interposed between the coupling-heads, four sleeves or bushings provided with heads and screwing into the block pivotally connecting the block with the coupling-heads, and four pins arranged to pass centrally through the sleeves and screw into the block to prevent the rotation of said sleeves, substantially as described.

5. A universal joint having, in combination, coupling-heads, a block or common binding-piece interposed between the coupling-heads, four sleeves or bushings provided with heads and screwing into the block pivotally connecting the block to the coupling-heads and effectually preventing spreading of the forks, and four pins provided with heads and arranged to pass through the sleeves and screw into the block to prevent the rotation of said sleeves substantially as described.

6. A universal joint having, in combination, coupling-heads, a block or common binding-piece interposed between the coupling-heads, four conical-headed sleeves or bushings screwing into the block pivotally connecting the block to the coupling-heads, and four conical-headed pins arranged to pass through the sleeves and screw into the block to prevent the rotation of said sleeves, substantially as described.

7. A universal joint having, in combination, coupling-heads, a block or common binding-piece interposed between the coupling-heads, four flange-headed sleeves or bushings screwing into the block pivotally connecting the block to the coupling-heads, and four conical-headed pins arranged to pass through the sleeves and screw into the block to prevent the rotation of said sleeves, substantially as described.

8. A universal joint having, in combination, coupling-heads, a block or common binding-piece interposed between the coupling-heads, four headed sleeves or bushings screwed into the block pivotally connecting the block with the coupling-heads, and four headed pins arranged to pass through the sleeves and screw into the block with a thread of different pitch from that used to screw the sleeves into the block, the said pins effectually locking and preventing the rotation of said sleeves, substantially as described.

9. A universal joint having, in combination, coupling-heads, a block or common binding-piece interposed between the coupling heads, four headed sleeves or bushings screwed into the block pivotally connecting the block with the coupling-heads, and four headed pins arranged to pass centrally through the sleeves and screw into the block with a thread opposite in direction from that used to screw the sleeves into the block, to lock and prevent the rotation of said sleeves, substantially as described.

In testimony whereof we affix our signatures in the presence of two witnesses.

WALTER S. TURPIN.
JONAS H. HOLDEN.

Witnesses:
H. C. WHISTIN,
A. Z. MORTON.